United States Patent
Yan (10) Patent No.: US 7,554,066 B2
(45) Date of Patent: *Jun. 30, 2009

(54) METHOD AND APPARATUS EMPLOYING DYNAMIC ELEMENT MATCHING FOR REDUCTION OF COLUMN-WISE FIXED PATTERN NOISE IN A SOLID STATE IMAGING SENSOR

(75) Inventor: Hai Yan, Fontana, CA (US)

(73) Assignee: Aptina Imaging Corporation (KY)

( * ) Notice: Subject to any disclaimer, the term of this patent is extended or adjusted under 35 U.S.C. 154(b) by 0 days.

This patent is subject to a terminal disclaimer.

(21) Appl. No.: 11/104,434

(22) Filed: Apr. 13, 2005

(65) Prior Publication Data

US 2006/0231732 A1    Oct. 19, 2006

(51) Int. Cl.
*H01L 27/00* (2006.01)
*H04N 5/217* (2006.01)
(52) U.S. Cl. ................................. 250/208.1; 348/241
(58) Field of Classification Search .............. 250/208.1, 250/214 R, 214.1; 348/302, 319–322, 241
See application file for complete search history.

(56) References Cited

U.S. PATENT DOCUMENTS

| 5,790,191 | A | 8/1998 | Zhang |
| 6,787,752 | B2 | 9/2004 | Tsai |
| 2002/0044211 | A1* | 4/2002 | Tujii et al. ............... 348/302 |
| 2002/0100862 | A1* | 8/2002 | Liu ............... 250/208.1 |
| 2002/0154347 | A1* | 10/2002 | Funakoshi et al. ......... 358/513 |
| 2003/0133625 | A1 | 7/2003 | Pain et al. |
| 2004/0041931 | A1 | 3/2004 | Tu et al. |
| 2004/0159771 | A1* | 8/2004 | Yang et al. ............. 250/208.1 |
| 2006/0125940 | A1* | 6/2006 | Tinkler et al. ............ 348/294 |

FOREIGN PATENT DOCUMENTS

EP    1 115 244 A3    7/2001

OTHER PUBLICATIONS

Analog Integrated Circuit Design by David Johns, Ken Martin John Wiley & sons; New York 1997 pp. 475-471, 507-509, and 565-576.
Korean Office Action, Jan. 19, 2009.

* cited by examiner

*Primary Examiner*—Thanh X Luu
(74) *Attorney, Agent, or Firm*—Dickstein Shapiro LLP (57) ABSTRACT

An imager having a switching circuit that couples pixel columns to different sample and hold circuits to reduce the noticeability of column-wise fixed pattern noise. A controller randomly couples a pixel column to a sample and hold circuit, therefore fixed pattern noise emanating from a particular sample and hold circuit is not always associated with a single pixel column. Therefore the visual perception of fixed pattern noise associated with a particular sample and hold circuit is reduced.

15 Claims, 6 Drawing Sheets

METHOD AND APPARATUS EMPLOYING DYNAMIC ELEMENT MATCHING FOR REDUCTION OF COLUMN-WISE FIXED PATTERN NOISE IN A SOLID STATE IMAGING SENSOR

FIELD OF THE INVENTION

The invention relates generally to semiconductor imaging devices, and more particularly to reducing the noticeability of fixed pattern noise in a solid state imager.

BACKGROUND OF THE INVENTION

There is a current interest in CMOS active pixel imagers for use as low cost imaging devices. Active pixel sensors can have one or more active transistors within the pixel unit cell, can be made compatible with CMOS technologies, and promise higher readout rates compared to passive pixel sensors.

Figure 1:
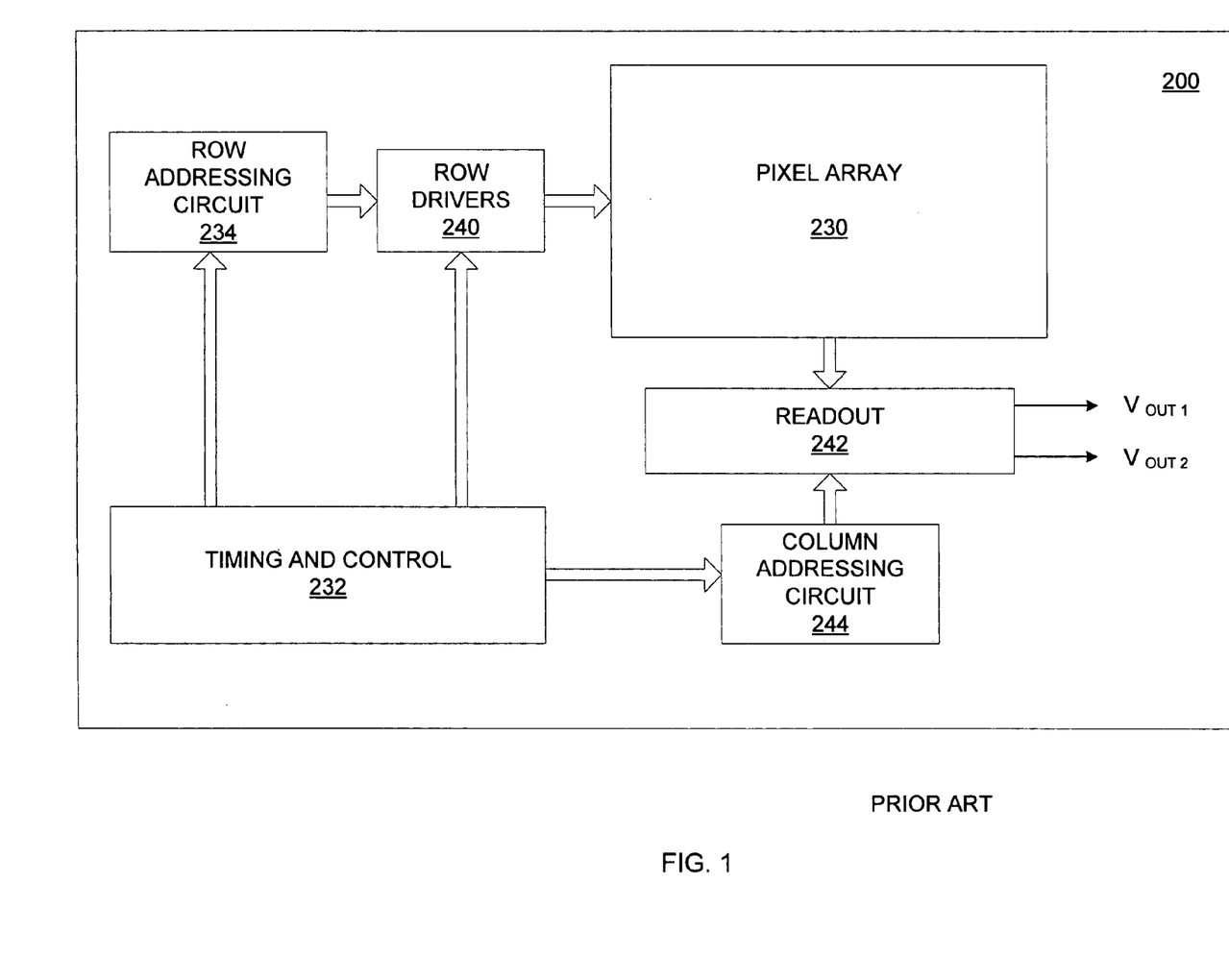
FIG. 1 is a block diagram of a conventional digital system having an active pixel sensor array and associated processing circuitry.

FIG. 1 shows a conventional imager 200 that includes an array of pixels 230 and a timing and control circuit or controller 232 which provides timing and control signals to control the reading out of signals stored in the pixels in a manner commonly known to those skilled in the art. Exemplary arrays have dimensions of M times N pixels, with the size of the array 230 depending on the particular application. The imager is read out a row at a time using a column parallel readout architecture. The controller 232 selects a particular row of pixels in the array 230 by controlling the operation of row addressing circuit 234 and row drivers 240. Charge signals stored in the selected row of pixels are provided on column lines 170 (FIG. 2) to a readout circuit 242 as conventionally known. Referring back to FIG. 1, the pixel signal read from each of the columns can then be read out sequentially using a column addressing circuit 244. Differential pixel signals corresponding to the read out reset signal (Vrst) and integrated charge signal (Vsig) are provided as respective outputs Vout1, Vout2 of the readout circuit 242.

Figure 2:
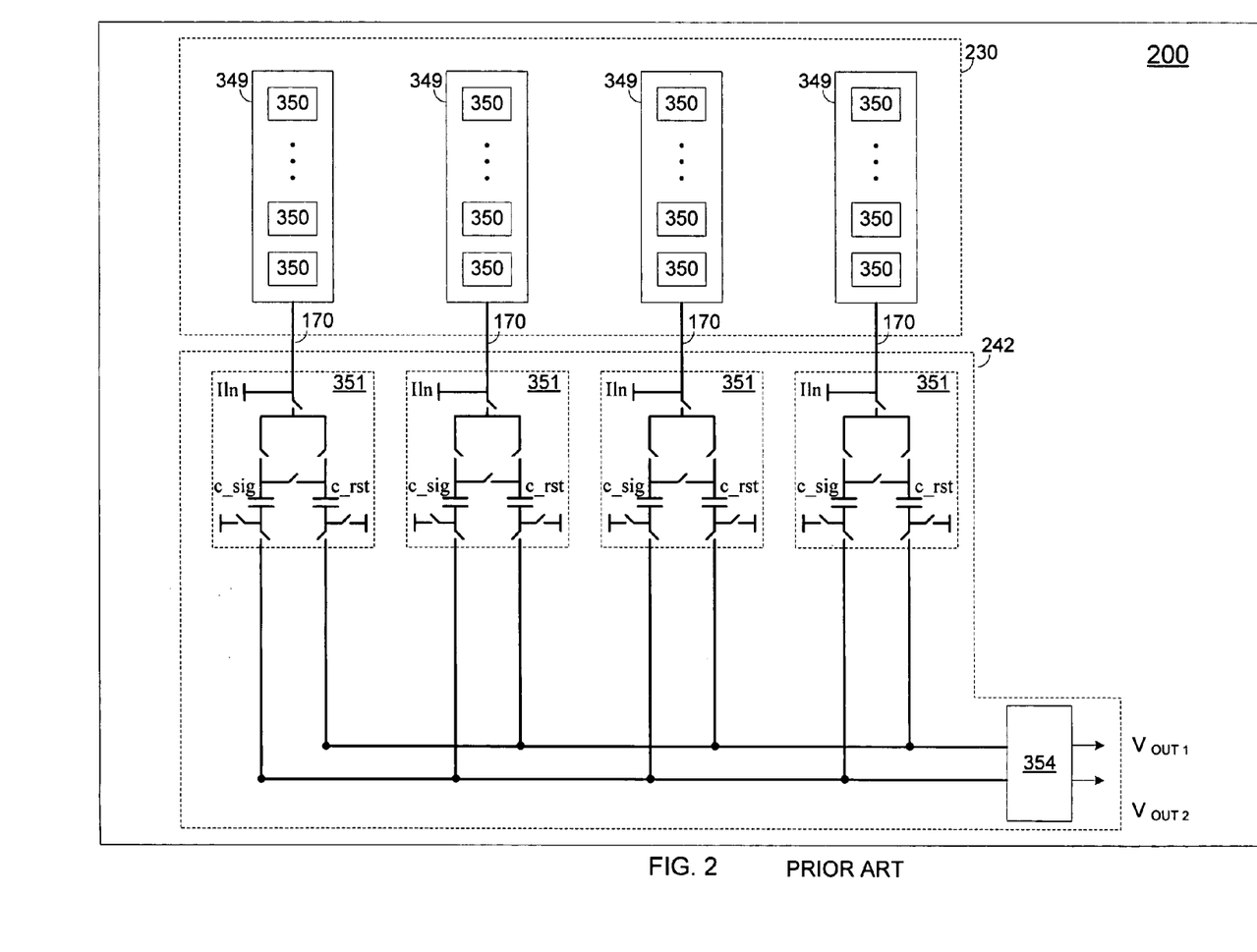
FIG. 2 is a block diagram showing a portion of the sensor of FIG. 1 in greater detail.

FIG. 2 more clearly shows the rows and columns 349 of pixel array 230 and the associated readout circuit 242. Each column 349 includes multiple rows of pixels 350. The readout circuit 242 includes sample and hold circuitry 351 for storing the pixel reset (Vrst) and integrated charge signals (Vsig). Signals from the pixels 350 in a particular column 349 can be read out through a column line 170 to the sample and hold circuit 351 associated with that column. Typically, Vrst is stored in capacitor c_rst and Vsig is stored in capacitor c_sig in the sample and hold circuit 351. The gain of the sample and hold circuit 351 is a function of a biasing current Iln connected to the column line 170.

Signals stored in the readout circuit 242 can be read out sequentially column-by-column to an output stage 354, which is common to the entire array of pixels 330. Output stage 359 provides two output signals Vout1, Vout2 that correspond to the Vsig, Vrst signals, respectively. The analog output signals Vout1, Vout2 can then be sent, for example, to a differential analog circuit, which subtracts the reset and integrated charge signals and sends the subtracted signal to an analog-to-digital converter (ADC); alternatively, the reset and integrated charge signals can be supplied directly to the analog-to-digital converter.

During manufacture, each imaging pixel array is usually tested individually. Tests detect defective pixel circuits, pixel signal level, and other array attributes, and the information is stored based on lot and individual device identification numbers. The information developed during testing can be utilized to enhance the operation of the device by, for example, compensating for defective pixels, differing pixel signal levels, and other tested pixel attributes.

Because variances occur during manufacturing, the capacitance values of capacitors c_rst and c_sig will be different, ideally only slightly different. However, it is not easy or cheap to test the capacitance value of each capacitor c_rst, c_sig and then modify the capacitors to have the same capacitance value. Thus, capacitors c_rst and c_sig of each sample and hold circuit 351 will add a different amount of column-wise fixed pattern noise to the readout process.

Similarly, the bias current Iln will vary from column to column. Although the difference may not be large, nonetheless, the different Iln current values will add different amounts of gain during read out of each sample and hold circuit 351. Thus, the bias current Iln of each sample and hold circuit 351 will add a different amount of column-wise fixed pattern noise to the relevant process.

The human eye is sensitive to column-wise noise, which may manifest as a column in an image being different from surrounding columns of the image. Therefore, it is desirable to modify the imager to reduce the visual obviousness of column-wise fixed pattern noise

BRIEF SUMMARY OF THE INVENTION

An imager is provided in an exemplary embodiment that reduces the visual obviousness of column-wise fixed pattern noise by randomly mixing and applying fixed pattern noise to different columns in the imager's array. In an exemplary embodiment of the invention, signals from the columns of the pixel array are read out to varying sample and hold circuits selected at random. In addition, pixel columns are randomly matched to sample and hold circuits.

BRIEF DESCRIPTION OF THE DRAWINGS

These and other features and advantages of the invention will be more readily understood from the following detailed description of the invention which is provided in connection with the accompanying drawings, in which:

FIG. 5(a) is a line graph showing occurrence of events in a periodic interval, T;

FIG. 5(b) is a line graph showing occurrence of events in a pseudo-random interval, T1a; and FIG. 5(c) is a line graph showing occurrence of events in a random interval, T1b.

FIG. 6(a) is a block diagram showing a pseudo-random matching of patterns T1 and Tx after a pseudo-random interval T1a;

FIG. 6(b) is a block diagram showing a random matching of patterns T1 and Ty after a random interval T1b.

DETAILED DESCRIPTION OF THE INVENTION

In the following detailed description, reference is made to the accompanying drawings, which form a part hereof, and in which is shown by way of illustration specific exemplary embodiments of the invention. These embodiments are described in sufficient detail to enable those of ordinary skill in the art to make and use the invention, and it is to be understood that structural, logical or other changes may be made to the specific embodiments disclosed without departing from the spirit and scope of the present invention.

Figure 3:
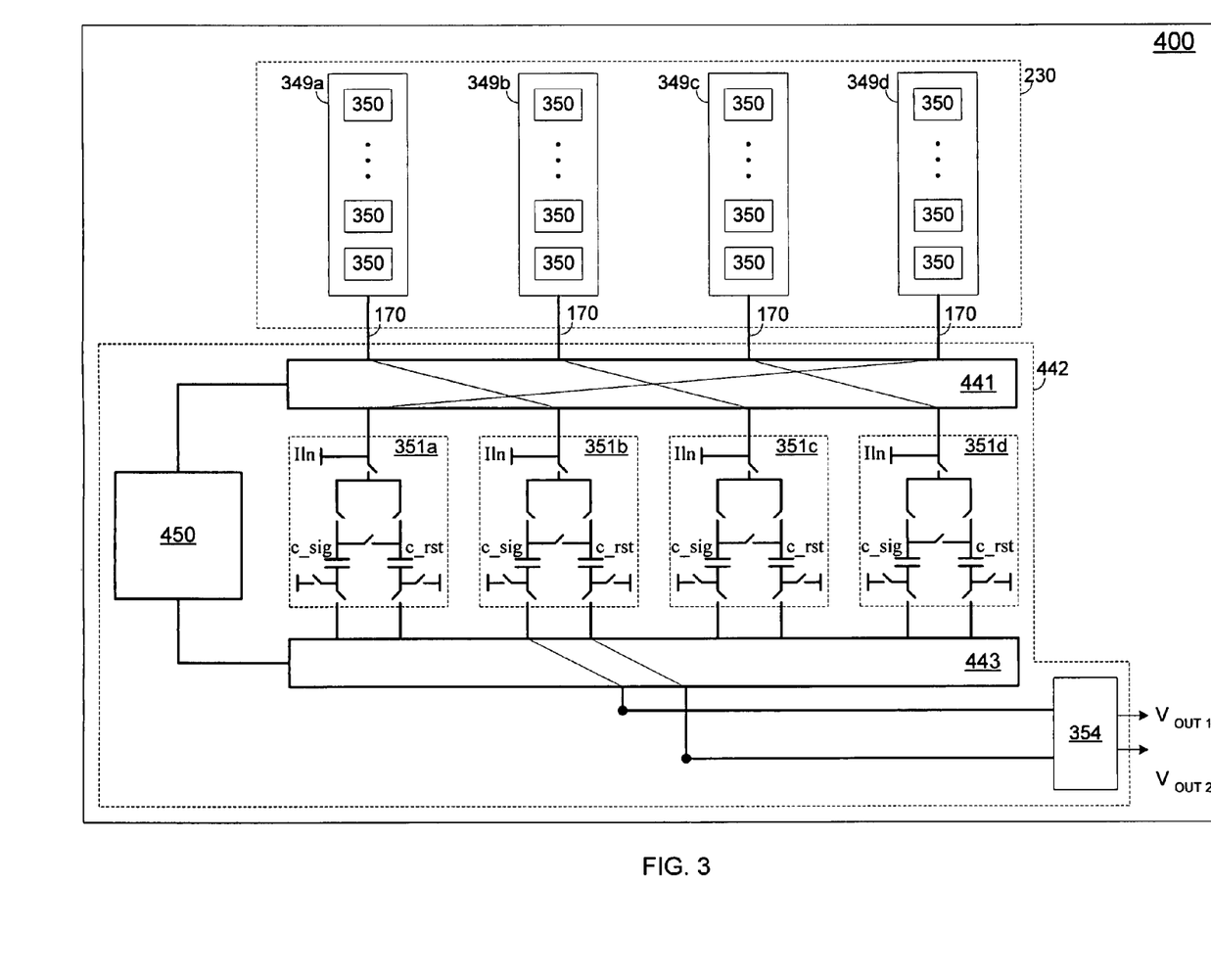
FIG. 3 is a block diagram of a digital system having an active pixel sensor array and associated processing circuitry in accordance with an exemplary embodiment of the invention.

FIG. 3 depicts a signal processing system 400, which includes an active pixel sensor ("APS") array 230 and a readout circuit 442 constructed in accordance with an exemplary embodiment of the invention. The signal processing system 400 differs from the system 200 illustrated in FIGS. 1 and 2 in several respects, which are described in greater detail below.

The illustrated system 400 includes pixel array 230 connected to the readout circuit 442. Readout circuit 442 includes a first switching circuit 441, second switching circuit 443, and a controller 450 for controlling the switching circuits 441, 443. The readout circuit 442 is different from the conventional readout circuit 242 (FIG. 2) in that sample and hold circuits 351a-d of readout circuit 442 are not always associated with the same pixel column 349a-d (explained in more detail below).

Each pixel column 349a-d is coupled to the first switching circuit 441. The switch setting of the first switching circuit 441 determines which pixel column 349a-d is selectively coupled to which sample and hold circuit 351a-d. For example, FIG. 3 depicts: the first pixel column 349a coupled through the first switching circuit 441 to the second sample and hold circuit 351b; the second pixel column 349b coupled through the first switching circuit 441 to the third sample and hold circuit 351c; the third pixel column 349c coupled through the first switching circuit 441 to the fourth sample and hold circuit 351d; and the fourth pixel column 349d coupled through the first switching circuit 441 to the first sample and hold circuit 351a. In an exemplary embodiment, the first switching circuit 441 enables each pixel column 349a-d to be substantially simultaneously coupled to an associated selected sample and hold circuit 351a-d. In another aspect, only a single pixel column is coupled to its associated selected sample and hold circuit at a time.

Figure 6:
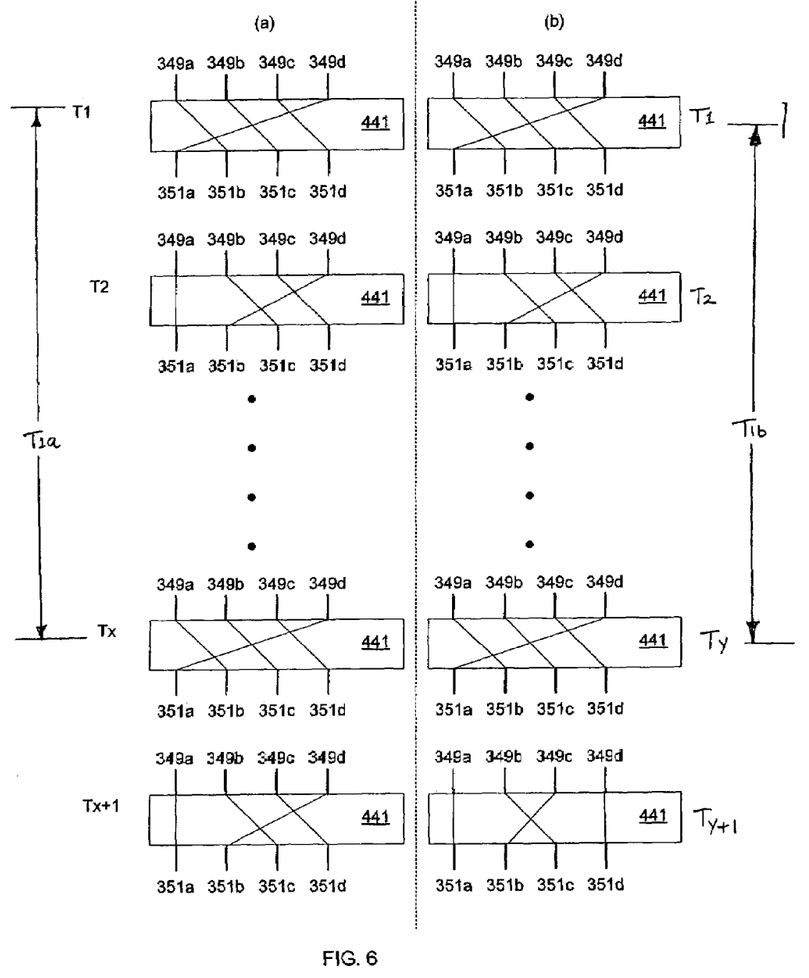

The controller 450 provides signals to the first switching circuit 441 indicating which pixel column 349a-d is to be coupled to which sample and hold circuit 351a-d. In a preferred embodiment, the controller's 450 matching of pixel columns 349a-d and sample and hold circuits 351a-d is done on a random basis (Ty of FIG. 6(b) after interval T1b). Although described with respect to a random assignment, the invention is not so limited. For example, the matching may occur in pseudo-random ((Tx, Tx+1 of FIG. 6(a) after interval T1a), or other varying matching fashion.

In an exemplary embodiment, the controller 450 re-matches, i.e., generates new matches between, pixel columns 349a-d and sample and hold circuits 351a-d before each read out from a row in the pixel array 230. For example, the controller 450 determines a match and then the selected row is readout, then the controller 450 determines a match and the next row is readout. In another aspect, the controller 450 re-matches periodically; that is to say that the time interval between the controller establishing another set of matches is a set time interval. The controller 450 establishes the time interval before reading out from the image array. For example, if the time interval is five, then the controller 450 rematches before each fifth read out from a row in the pixel array 230. In yet another aspect, the controller 450 re-matches at various time intervals, where the time intervals are generated on a varying fashion, ideally in a random fashion. For example, if the time interval to re-match is random, then the controller 450 re-matches before the first, fifth, and thirteenth read outs from rows in the pixel array 230. Although this invention is described with reference to a conventional readout from an array (e.g., sequentially reading a row from the first column on the left to the last column on the right and then repeating for the next row), the invention is not so limited. For example, the imager may be readout in an interleaved fashion. Additionally, there are times when not all of the rows or columns are read out, e.g., when varying the resolution of the imager.

The output of each sample and hold circuit 351a-d is coupled to the second switching circuit 443. The selection of the second switching circuit 443 determines which sample and hold circuit 351a-d is coupled to the output stage 354. The controller 450 provides signals to the second switching circuit 443 indicating which sample and hold circuit 351a-d is to be coupled to the output stage 354. The controller 450 provides a signal to the second switching circuit 443 before the read out of a sample and hold circuit 351a-d.

In a preferred embodiment, the controller's 450 matching of sample and hold circuits 351a-d to output stage 354 is performed based on the current matching of pixel columns 349a-d to sample and hold circuits 351a-d by the controller 450. For example, in conventional systems where a row is read out sequentially, left to right, and the controller matched the first pixel column 349a with the second sample and hold circuit 351b, the second pixel column 349b with the third sample and hold circuit 351c, the third pixel column 349c with the fourth sample and hold circuit 351d, and the fourth pixel column 349d with the first sample and hold circuit 351a, then the first sample and hold circuit to be readout to the output stage 354, is the second sample and hold circuit 351b. Therefore, the controller 450 provides an appropriate signal to the second switching circuit 443 to couple the second sample and hold circuit 351b to the output stage 354. For the next read out, the controller 450 provides an appropriate signal to the second switching circuit 443, to couple the third sample and hold circuit 351c to the output stage 354. For the next read out, the controller 450 provides an appropriate signal to the second switching circuit 443 to couple the fourth sample and hold circuit 351d to the output stage 354. For the next read out, the controller 450 provides an appropriate signal to the second switching circuit 443 to couple the first sample and hold circuit 351a to the output stage 354. In an alternative embodiment, the controller 450 provides a signal to a separate processing circuit (not shown) indicating the match for each row and the sample and hold circuits 351a-d will be read out sequentially left to right (i.e. circuits 351a to 351d). The separate processing circuit coordinates re-ordering the signals from each column such that they are representative of the order in which they originate in the image array. In this aspect of the invention, a second switching circuit 442 is not required as the sample and hold circuits 351a-d are coupled directly to the output stage 354.

Signals stored in the readout circuits 442 can then be read sequentially column-by-column to the output stage 354, which is common to the entire array of pixels 230. The analog output signals can then be sent, for example, to a differential analog circuit, which subtracts the reset and integrated charge signals and sends the subtracted signal to an analog-to-digital converter (ADC); alternatively, the reset and integrated charge signals can be supplied directly to the analog-to-digital converter.

Therefore, an imager is provided that reduces the visual obviousness of column-wise fixed pattern noise by randomly mixing and applying fixed pattern noise to different columns of the array. Fixed pattern noise is not necessarily reduced, however, fixed pattern noise from a sample and hold circuit is not always associated with a single pixel column but is instead associated with different pixels. As the noise is applied to different columns, the human eye is less likely to notice the noise.

Figure 4:
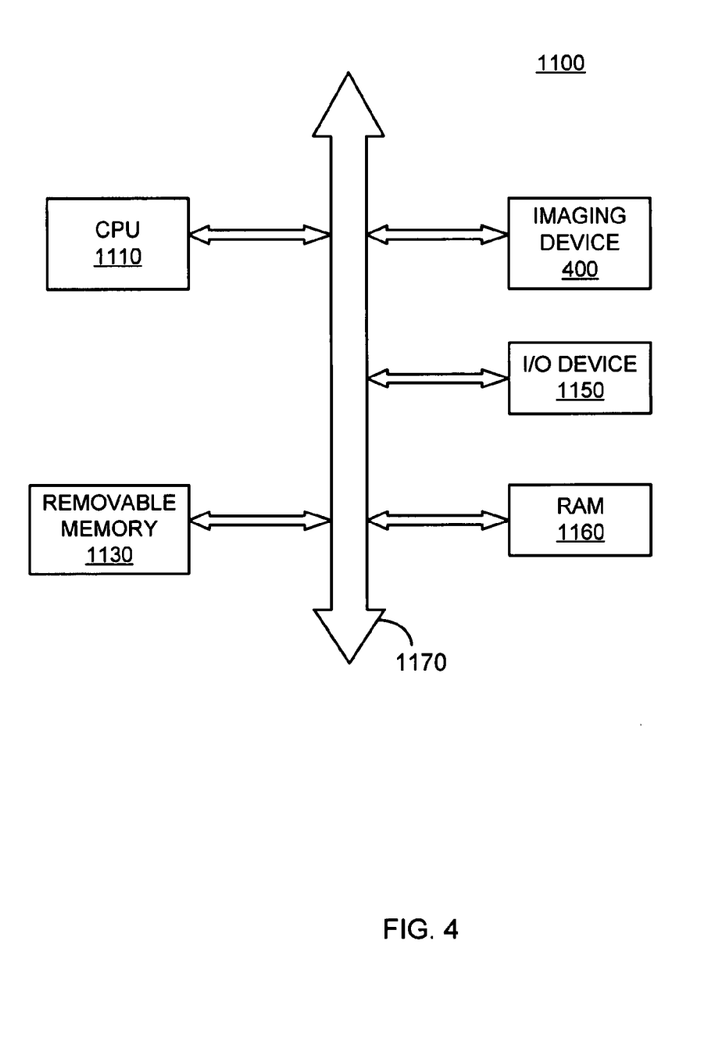
FIG. 4 is a block diagram showing a processor system incorporating at least one imaging device constructed in accordance with an embodiment of the invention.
Figure 5:
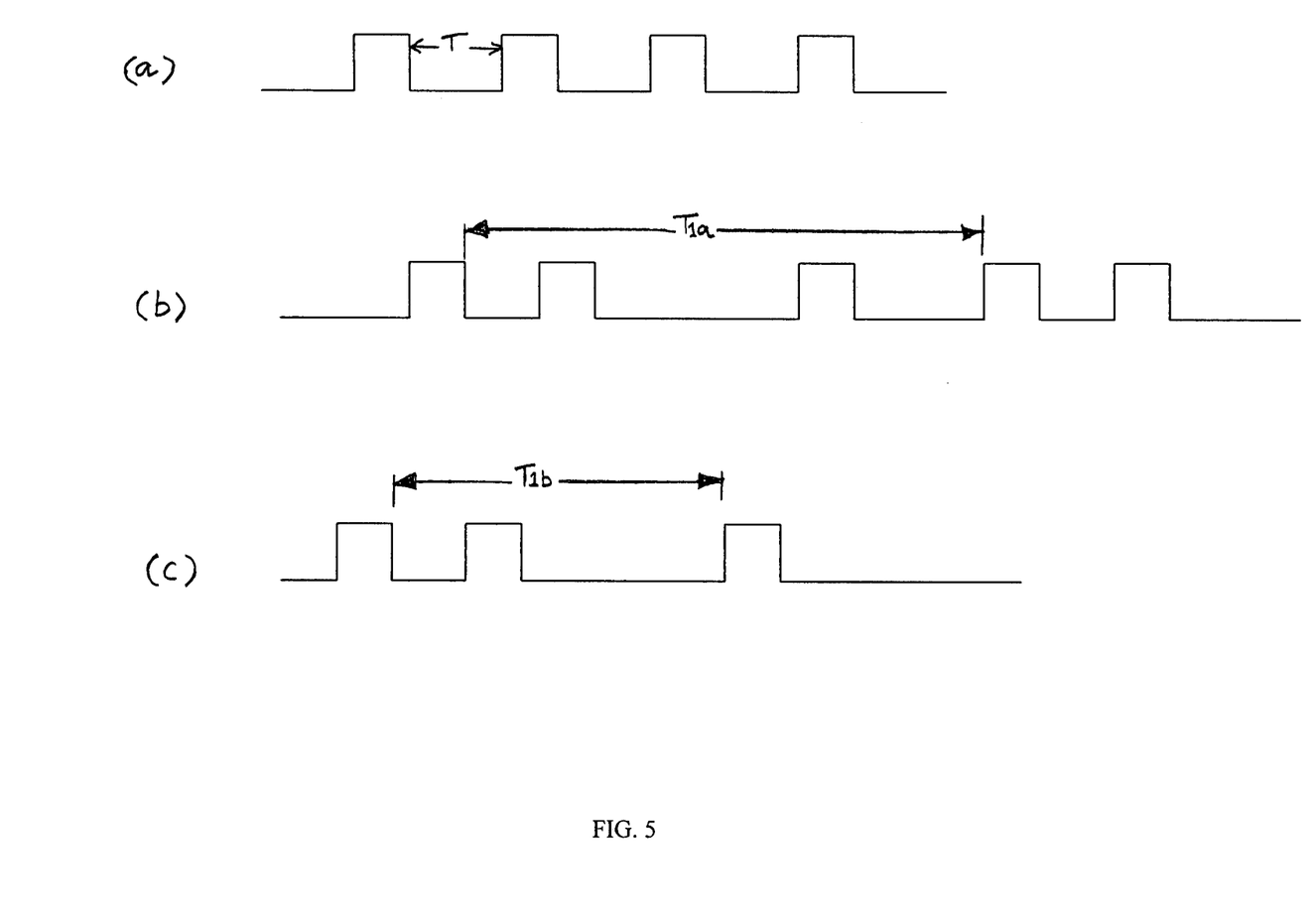

FIG. 4 shows system 1100, a typical processor system modified to include an APS System 400 containing the readout system, as exemplified by FIG. 3. The system 1100 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and others.

System 1100, for example a camera system, generally comprises a central processing unit (CPU) 1110, such as a microprocessor, that communicates with an input/output (I/O) device 1150 over a bus 1170. Imaging device 400 also communicates with the CPU 1110 over the bus 1170. The system 1100 also includes random access memory (RAM) 1160, and can include removable memory 1130, such as flash memory, which also communicate with the CPU 1110 over the bus 1170. The imaging device 400 may be combined with a processor, such as a CPU, digital signal processor, or microprocessor, with or without memory storage on a single integrated circuit or on a different chip than the processor.

It should be appreciated that other embodiments of the invention include a method of manufacturing the circuit 1100. For example, in one exemplary embodiment, a method of manufacturing an CMOS readout circuit includes the steps of providing, over a portion of a substrate corresponding to a single integrated circuit, at least a pixel array and readout circuit of FIGS. 3 an 4 as described above using known semiconductor fabrication techniques. The method of manufacturing the readout circuit includes forming a plurality of sample and hold circuits over said substrate; and forming a switching circuit over said substrate for switchingly coupling one of said plurality of columns of pixels in said pixel array to one of said sample and hold circuits. The method of manufacturing may further include forming a control circuit over said substrate; and forming an electrical pathway for coupling said control circuit to said switching circuit. Additionally, the method of manufacturing may include the step of forming a second switching circuit over said substrate for switchingly coupling one of said sample and hold circuits to said downstream circuit.

While the invention has been described and illustrated with reference to specific exemplary embodiments, it should be understood that many modifications and substitutions can be made without departing from the spirit and scope of the invention. For example, although the invention is shown with respect to two switching circuits and the associated controller the invention is not meant to be so limiting. The controller functionality can be incorporated into the a controlling circuit already included in conventional system. Accordingly, the invention is not to be considered as limited by the foregoing description but is only limited by the scope of the claims.

What is claimed as new and desired to be protected by Letters Patent of the United States is:

1. A readout circuit for an imaging device, comprising:
a switching circuit adapted to selectively couple each of a plurality of columns of a pixel array to one of a plurality of sample-and-hold circuits; and
a controller for generating a match between one of said plurality of columns of said pixel array and one of said plurality of said sample and hold circuits and providing a first control signal to said switching circuit indicating said match, said first control signal indicating which of said plurality of columns is to be coupled to which one of said sample and hold circuits, wherein said controller generates a match such that an interval between matching is a random interval.

2. A readout circuit as in claim 1, wherein said controller generates a match such that matching is done randomly.

3. A readout circuit as in claim 1, wherein said controller generates a match such that matching is done pseudo-randomly.

4. A method of reading signals from an imaging device comprising:
selectively coupling through a switching circuit each of a plurality of columns of a pixel array to one of a plurality of sample-and-hold circuits;
providing a first control signal to said switching circuit, said first control signal indicating which of said plurality of columns is matched to be coupled to which of said sample and hold circuits; and
generating new matches on a random interval.

5. A method of reading signals from an imaging device as in claim 4, wherein matching is done pseudo-randomly.

6. A method of reading signals from an imaging device as in claim 4, wherein matching is done pseudo-randomly.

7. An integrated circuit comprising:
a pixel array;
a readout circuit coupled to said pixel array, comprising:
a switching circuit adapted to selectively couple each of a plurality of columns of said pixel array to one of a plurality of sample-and-hold circuits; and
a controller for providing a first control signal to said switching circuit, said first control signal indicating which of said plurality of columns is to be coupled to which one of said sample and hold circuits, wherein said controller generates a match between one of said plurality of columns of said pixel array and one of said plurality of said sample and hold circuit such that an interval between matching is a random interval.

8. An integrated circuit as in claim 7, wherein said controller generates a match such that matching is done randomly.

9. An integrated circuit as in claim 7, wherein said controller generates a match such that matching is done pseudo-randomly.

10. An imager device comprising:
a pixel array;
a readout circuit coupled to said pixel array, comprising:
a switching circuit adapted to selectively couple each of a plurality of columns of said pixel array to one of a plurality of sample-and-hold circuits; and
a controller for providing a first control signal to said switching circuit, said first control signal indicating which of said plurality of columns is to be coupled to which one of said sample and hold circuits, wherein said controller generates a match between one of said plurality of columns of said pixel array and one of said plurality of said sample and hold circuit such that an interval between matching is a random interval.

11. An imager device as in claim 10, wherein said controller generates a match such that matching is done randomly.

12. An imager device as in claim 10, wherein said controller generates a match such that matching is done pseudo-randomly.

13. A processor system, comprising:
a processor; and
imager device, comprising:
a pixel array;

a readout circuit coupled to said pixel array, comprising:
a switching circuit adapted to selectively couple each of a plurality of columns of said pixel array to one of a plurality of sample-and-hold circuits; and
a controller for providing a first control signal to said switching circuit, said first control signal indicating which of said plurality of columns is to be coupled to which one of said sample and hold circuits, wherein said controller generates a match between one of said plurality of columns of said pixel array and one of said plurality of said sample and hold circuit such that an interval between matching is a random interval.

14. A processor system as in claim 13, wherein said controller generates a match such that matching is done randomly.

15. A processor system as in claim 13, wherein said controller generates a match such that matching is done pseudo-randomly.

* * * * *